US010250716B2

United States Patent
Joshi et al.

(10) Patent No.: US 10,250,716 B2
(45) Date of Patent: Apr. 2, 2019

(54) PRIORITY-DRIVEN BOXCARRING OF ACTION REQUESTS FROM COMPONENT-DRIVEN CLOUD APPLICATIONS

(71) Applicant: salesforce.com, inc., San Francisco, CA (US)

(72) Inventors: Shweta Joshi, Newark, CA (US); Ashraya Raj Mathur, Fremont, CA (US); Ronnie Fong, San Jose, CA (US); Jianxun Jason Ding, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 181 days.

(21) Appl. No.: 15/199,768

(22) Filed: Jun. 30, 2016

(65) Prior Publication Data
US 2018/0007166 A1    Jan. 4, 2018

(51) Int. Cl.
*H04L 29/08*      (2006.01)
*H04W 4/50*      (2018.01)

(52) U.S. Cl.
CPC ............ *H04L 67/327* (2013.01); *H04L 67/02* (2013.01); *H04W 4/50* (2018.02)

(58) Field of Classification Search
CPC ....... H04L 67/327; H04L 67/42; H04L 67/02; H04W 4/50; H04W 4/001
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Michael A Keller
*Assistant Examiner* — Javier O Guzman
(74) *Attorney, Agent, or Firm* — Sterne, Kessler, Goldstein & Fox P.L.L.C.

(57) ABSTRACT

Improved perceived load time for browser and mobile application pages is achieved by adjusting boxcarring of action requests from coupled data consuming applications on the user device, using the priority level of regions and components in component-driven cloud applications. Priority labels differentiate among display regions rendered by the data consuming application and the priority labels further differentiate among components within respective display regions. The middleware application batches the action requests into batches based at least in part on the priority labels, into boxcars segregated by priority label according to a predetermined segregation schedule, and dispatches the boxcars of batched action requests to the server. Performance is also dynamically speeded up, by adjusting inter-boxcar intervals used to dispatch batches of action requests from the user device to a production server, based on the dynamically measured network communication latency between the user device and the server.

25 Claims, 9 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,694,302 B1 * | 4/2010 | Rajan ................ G06F 9/5061 |
| | | 718/102 |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0014480 A1 * | 1/2003 | Pullara ................ G06F 11/2035 |
| | | 709/203 |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0207439 A1 * | 9/2005 | Iyengar ................ H04L 67/322 |
| | | 370/428 |
| 2006/0021019 A1 | 1/2006 | Hinton et al. |
| 2007/0050838 A1 * | 3/2007 | Liu ........................ A63F 13/12 |
| | | 726/3 |
| 2007/0118652 A1 * | 5/2007 | Diedrich ................ G06F 9/5027 |
| | | 709/226 |
| 2007/0244987 A1 * | 10/2007 | Pedersen ............. H04L 63/0272 |
| | | 709/217 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0115612 A1 * | 5/2010 | O'Brien ................ G06F 15/0291 |
| | | 726/22 |
| 2011/0023038 A1 * | 1/2011 | Memik ................ G06F 9/3824 |
| | | 718/101 |

(56) References Cited

U.S. PATENT DOCUMENTS

| | | | |
|---|---|---|---|
| 2011/0029670 A1* | 2/2011 | Klein | H04W 4/02 709/225 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0102152 A1* | 4/2012 | Pearson | G06F 17/30905 709/219 |
| 2012/0233137 A1 | 9/2012 | Jakobson et al. | |
| 2012/0290407 A1 | 11/2012 | Hubbard et al. | |
| 2013/0054741 A1* | 2/2013 | Jooste | H04L 67/02 709/217 |
| 2013/0212497 A1 | 8/2013 | Zelenko et al. | |
| 2013/0247216 A1 | 9/2013 | Cinarkaya et al. | |
| 2013/0304797 A1* | 11/2013 | Warren | G06Q 40/02 709/203 |
| 2014/0101235 A1* | 4/2014 | Smedberg | G06F 17/2235 709/203 |
| 2014/0281492 A1* | 9/2014 | Hunt | H04L 9/3223 713/155 |
| 2015/0067024 A1* | 3/2015 | Nesbitt | G06F 17/30902 709/203 |
| 2017/0331918 A1* | 11/2017 | Szabo | H04L 67/322 |

* cited by examiner

FIG. 3B

```
<body>
<div class="DESKTOP uiContainerManager flexipageEditorSurface">
<div class="forceStyle flexipageEditorSurface">
<div data-type="page" class="flexipageEditorPage">
<div class="responsiveContents homeDesktopTemplate">
<div class="colMain">
<div class="top">                              632
    <div data-type="region"
    data-max-allowed="25"
    data-allow-drop="true"
    data-allowed="flexipage:
    availableForAllPageTypes,home:
    availableForDesktop"
    class="flexipageEditorRegion" priority="1">
        <a class=                           645
        "flexipageEditorRegionPlaceholder" href="javascript:void(0);" >Add Component(s) Here</a>
</div>
<div class="bottomWrapper">
    <div class="bottomLeft">                 652
        <div data-type="region"
        data-max-allowed="25"
        data-allow-drop="true"
        data-allowed="flexipage:
        availableForAllPageTypes,home:
        availableForDesktop"
        class="flexipageEditorRegion" priority="2">  665
        <a class="flexipageEditorRegionPlaceholder" href="javascript:void(0);" >Add Component(s) Here</a>
</div>
</div>
```

FIG. 6

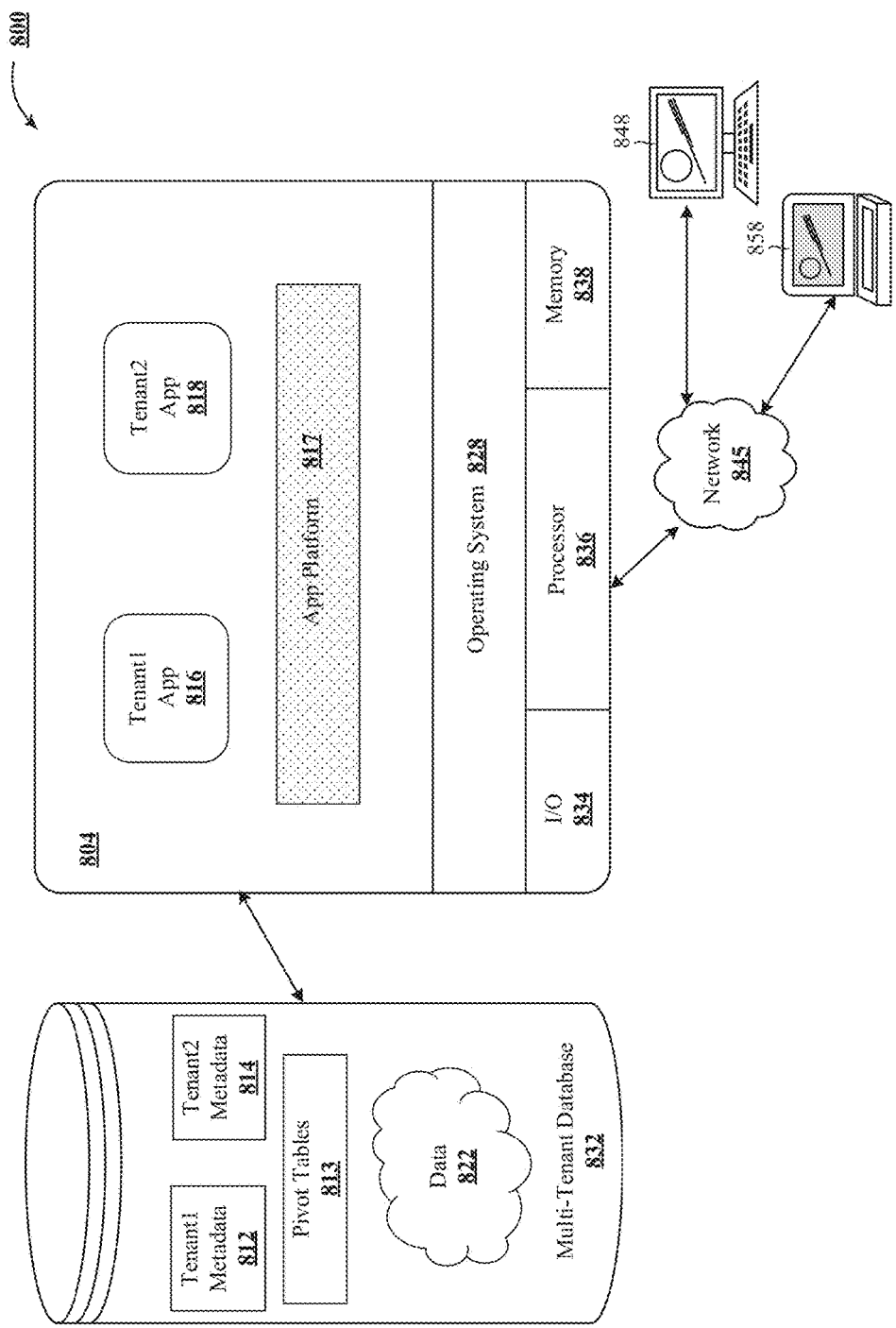

PRIORITY-DRIVEN BOXCARRING OF ACTION REQUESTS FROM COMPONENT-DRIVEN CLOUD APPLICATIONS

RELATED APPLICATION

This application is related to U.S. patent application Ser. No. 15/199,759, entitled "DYNAMIC ADJUSTMENT OF BOXCARRING OF ACTION REQUESTS FROM COMPONENT-DRIVEN CLOUD APPLICATIONS" filed Jun. 30, 2016. The related application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In today's world, both developers and end users are dealing with large numbers of clients and huge data volumes, popularly referred to as "Big Data". Web applications that serve and manage millions of Internet users, such as Facebook™ Instagram™, Twitter™, banking websites, or even online retail shops, such as Amazon.com™ or eBay™ are faced with the challenge of delivering applications as fast as possible so that the end users can be provided with a real-time experience.

Another major contributor the need to deliver fast applications is a concept and paradigm called "Internet of Things" (IoT). IoT is about a pervasive presence in the environment of a variety of things/objects that through wireless and wired connections are able to interact with each other and cooperate with other things/objects to create new applications and services. These applications and services are in areas likes smart cities (regions), smart car and mobility, smart home and assisted living, smart industries, public safety, energy and environmental protection, agriculture and tourism.

Transaction speed is a critical part of user experience—with more than three billion plus transactions daily for a single very large enterprise. A fast experience encourages users to return to the applications of an enterprise more often and to feel delighted about using them. Currently, there is a need for dynamic optimization of the speed of transactions between client and application servers, for users of component-driven multi-tenant cloud applications delivered as software as a service.

Therefore, an opportunity arises to speed up performance of a browser page or a client application with multiple components, including improving the network performance, and maintaining a performant user experience. The disclosed technology relates to dynamically adjusting boxcarring of action requests from component-driven cloud applications to speed up performance of a browser or application page with multiple components, in a cloud-based multi-tenant environment. The disclosed technology also improves perceived page performance of browser and application pages with multiple regions and components.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems are usable for speeding up performance of a web page with multiple components rendered on a user device. A data consuming application, running on a user device, makes action requests to at least one server and consumes data received from the server responsive to the action requests. A middleware application, also running on the user device, measures network communication latency, adjusts inter-boxcar intervals used to dispatch batches of action requests; and dispatches boxcars of batched action requests. The measured network communication latency is calculated as dispatch-to-completed response time minus server processing time and the server processing time is received from the server for a boxcar of completed responses. The inter-boxcar intervals are adjusted, taking into account at least (a) a number of connections supported between the user device and the server and (b) the measured network communication latency. A browser or app running on the user device, in communication with the middleware application, supports the data consuming application; and the server runs a dispatcher and one or more application programs. The dispatcher receives the transmitted boxcar of action requests, forwards the action requests to the application programs, and returns the boxcar of completed responses; and calculates the server processing time as the difference between when the boxcar of action request is received and when the boxcar of completed responses is ready to be returned, and reports the calculated server processing time back to the middleware application.

A disclosed method for conserving connections between a browser or app running on a user device and one server includes running a middleware application on the user device, coupled in communication with a data consuming application and a browser or app running on the user device, and also coupled in communication with at least one server through the browser or app. The middleware application receives action requests from the data consuming application qualified by priority labels applied to regions and components in the regions and returns data received from the server responsive to the action requests. The priority labels differentiate among display regions rendered by the data consuming application and at least some of the priority labels further differentiate among components within respective display regions. The middleware application batches the action requests into batches based at least in part on the priority labels, into boxcars segregated by priority label according to a predetermined segregation schedule, and dispatches the boxcars of batched action requests to the server.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3B shows a dynamic browser scorecard for deducing network communication latency.

FIG. 6 shows an example code snippet for designing web pages for priority-driven boxcarring via a region-based app editor.

FIG. 8 is a block diagram of an example multi-tenant computer system capable of dynamically adjusting boxcarring of action requests from component-driven cloud applications.

DETAILED DESCRIPTION

Introduction

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Application speed is a critical part of user experience. A fast experience will encourage users to return to applications more often and enjoy using the applications. For example, timely delivery of browser pages with "live" data analytics can illuminate puzzling business quandaries. The applications are available to users across smartphones, tablets, laptops and desktops, as well as other form factors.

Dynamic adjustment of boxcarring of action requests from component-driven cloud applications is usable to speed up performance of a browser page or a client application with multiple components, to optimize the network performance, and maintain a performant user experience in a cloud-based environment. Dynamically adjusting boxcarring of action requests from component-driven cloud applications is usable to can speed up performance for a plurality of tenants who are managing their digital data on independent software instances, as well as for a group of users who share a common access with a specific set of privileges to a software instance of at least one application.

To increase perceived web page performance, the goal is to prioritize delivery of specified regions and components, in addition to adjusting the loading of component actions based on the user's dynamic network communication latency.

The disclosed dynamic network optimization environment described next is usable to enhance both absolute and perceived page performance for applications, as a critical part of the user experience.

Environment

Figure 1:
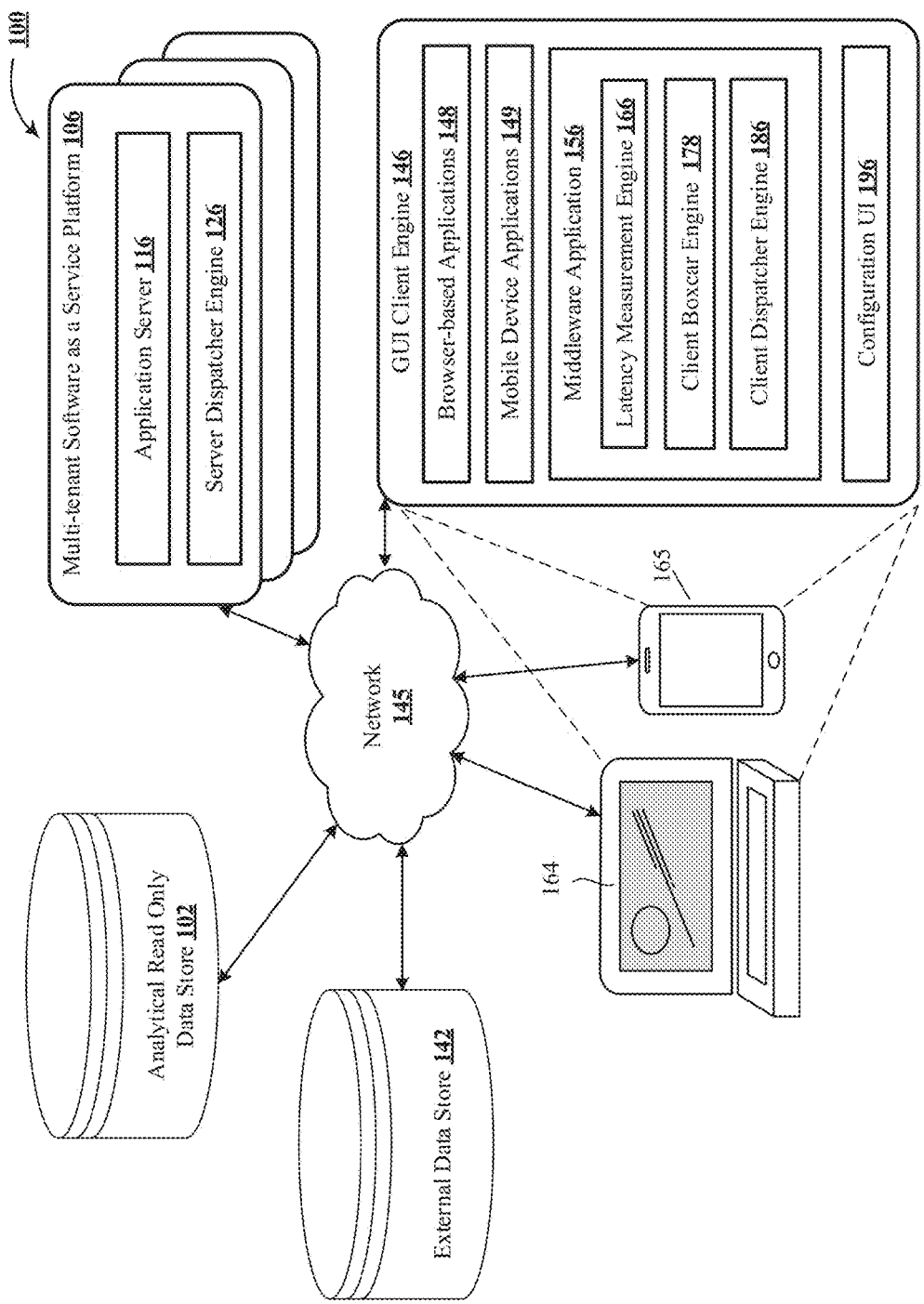
FIG. 1 illustrates an example business information and analytics architecture environment capable of dynamically adjusting boxcarring of action requests from component-driven cloud applications.

FIG. 1 illustrates one environment 100 for implementing dynamic adjustment of boxcarring of action requests from component-driven cloud applications. Environment 100 includes GUI client engine 146 which includes browser-based applications 148, mobile device applications 149 and middleware application 156. Middleware application 156 includes latency measurement engine 166, client boxcar engine 178 and client dispatcher engine 186. Latency measurement engine 166 dynamically determines the latency: the time required for a round trip for a boxcar packet, from the client dispatcher engine 186 of GUI client engine 146 to application server 116, for recent transactions. The network communication latency for each server request is the time between a client dispatching a request and the client receiving a response, excluding the time spent on the server. Client boxcar engine 178 arranges requests for action into a batch, and client dispatcher engine 186 sends each batch of action requests to the server as a single network request—in a boxcar—from the browser-based applications 148 and mobile device applications 149 to application server 166.

Perceived page performance includes the delivery of prioritized regions and components. GUI client engine 146 also includes client configuration UI 196 that provides a region-based app editor for adding priority rankings. The user can rank the components in a priority order of their choosing, for optimizing perceived page performance for customized pages. Using an app builder interface, a user is able to specify which components are assigned to which regions and also allocate a priority for each of these regions. Each component added within the specified region gets loaded based on the assigned priority for that region.

Also shown in the environment are analytical read-only data store 102, external data store 142 and multi-tenant software-as-a-service platform 106 which includes application server 116 and server dispatch engine 126. For a very large enterprise, as many as twenty to thirty multi-tenant software-as-a-service platforms 106 can handle user transactions across the globe simultaneously. Server dispatch engine 126 receives the transmitted boxcar of action requests, forwards the action requests to the application programs, and returns the boxcar of completed responses.

Analytical read-only data store 102 includes read-only datasets, with attributes of multiple users, usable for querying and viewing query results in real time, for large data sets being analyzed. Analytical read-only data store 102 includes datasets extracted from multi-tenant software-as-a-service platform 106 on a batch basis, in one example. The data extracted from large data repositories can be compiled into analytical read-only data store 102, and is usable to create "raw" datasets—read-only data structures for analytics—that can be augmented, transformed, flattened, etc. and published as customer-visible datasets for business entities.

External data store 142 can include data from sources that are not part of an enterprise's content management system. Examples of external systems include but are not limited to SAP™, ORACLE E-BUSINESS™, PEOPLESOFT™, NETSUITE™ and WORKDAY™. This data can include customer purchase history, demographics, relationships, and preferences. In one example, data can be represented as comma separated values (CSV) that represent sales quotas for a competitor, provided in a spreadsheet format. Data can be received in other formats—including, but not limited to, other delimiter-separated formats, bitmapped images, Ogg format containers for different types of multimedia, and proprietary file formats.

The environment shown in FIG. 1 includes application server 116, which runs all kinds of apps in the cloud—providing software as a service, such as customer relationship management, HR, accounting, and much more. Environment 100 also includes multi-tenant software-as-a-service platform 106, which includes application server 116 and can be of varying types including a workstation, server, computing cluster, blade server, server farm, or any other data processing system or computing device.

Additionally network 145 can be any network or combination of networks of devices that communicate with one another, and communicate among the data stores, servers, and engines described herein. For example, network 145 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Analytical read-only data store 102, external data store 142, and multi-tenant software-as-a-service platform 106 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. Analytical, read-only databases can implement response times of under two seconds when searching over twenty million records and compiling aggregate statistics from selected records.

In some implementations, user computing device 164 can be a personal computer, a laptop computer, tablet computer, smartphone or other mobile computing device, personal digital assistant (PDA), digital image capture devices, and the like. In some implementations, user mobile device 165 can be a tablet computer, smartphone or other mobile computing device, personal digital assistant (PDA), digital image capture devices, and the like.

GUI client engine 166 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. In one implementation, GUI client engine 166 can be accessed from a browser running on a computing device. The browser can be CHROME™, INTERNET EXPLORER™, FIREFOX™ SAFARI™ OPERA™, ANDROID™, BLACKBERRY™ and the like. In other implementations, dispatcher engine 176 and batch engine 178 can run on a computer desktop application.

In other implementations, environment 100 for implementing dynamic adjustment of boxcarring of action requests from component-driven cloud applications may not have the same elements or components as those listed above and/or may have other/different elements or components instead of, or in addition to, those listed above, such as a web server and template database. The different elements or components can be combined into single software modules and multiple software modules can run on the same hardware. Communication between component-driven cloud applications and application servers is considered at multiple levels in the data flow for a system; one example is described next.

Figure 2:
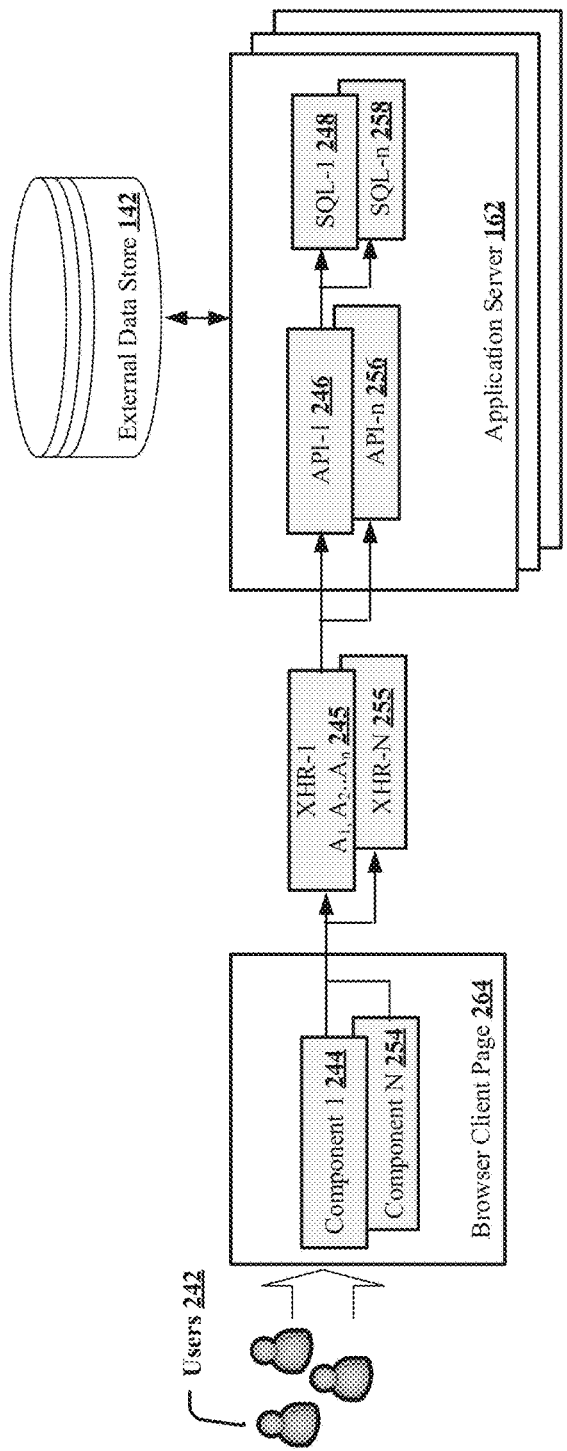
FIG. 2 shows an example page delivery architecture block diagram for browsers and mobile device applications.

FIG. 2 shows an example page delivery architecture which includes users 242 of browser web pages and mobile app pages. Components are self-contained, reusable units of an app that represent a reusable section of the UI, and can range in granularity from a single line of text to an entire app. Users can interact with a data consuming application running on a user device via browser client page 264 includes component 1 244 to component N 254. Each component can request information from the server using "server actions" to make action requests, and each component can employ the use of multiple server actions to deliver the "component view" of the page to the user. The data consuming application running on the user device consumes the data received from the server responsive to the action requests. In one implementation, an enterprise employs a framework that includes a set of prebuilt components that can be assembled and configured to form new regions which are rendered to produce HTML DOM elements within the browser or for a mobile app UI.

Boxcarring is a method of grouping a set of action requests together and executing them at once. A page can employ multiple XHRs to deliver the "page view" to the user. Boxcars, XHR-1 245 to XHR-N 255, include sets of component action requests $A_1, A_2 \ldots A_n$. In one use case, XHR data can be in the form of XML, JSON, HTML or plain text. The response data can be evaluated by client-side scripting. For example, if a component was formatted as JSON by the web server, the component can convert the received JSON into a client-side data object for delivering the "component view" of the page to the user.

Middleware application 156, also running on the user device, measures network communication latency, adjusts inter-boxcar intervals used to dispatch batches of action requests, and dispatches boxcars of batched action requests. Multiple actions are boxcarred into an XMLHttpRequest (XHR). XHR is an API that provides client functionality for transferring data between a client and a server—for sending HTTP or HTTPS requests to a web server and loading the response data received from the server responsive to the action requests back to the client page.

Continuing with the description of FIG. 2, boxcars XHR-1 245 to XHR-N 255 transport the groups of action requests to application server 116 to API-1 246 to API-n 256, which use SQL 1 248 to SQL-n 258 to execute the component requests. Each action can call multiple different APIs on application server 116; and XHR-1 245 to XHR-N 255 can each include multiple actions, each calling multiple different APIs. A single XHR, with multiple actions batched inside, gets processed by a single application server. Multiple XHRs from the same client on the same page can get serviced by different app servers.

Server dispatcher engine 126 receives the transmitted boxcar of action requests, forwards the action requests to the application programs, and returns the boxcar of completed responses. Responses are grouped by server dispatcher engine 126 into the same boxcar as those in which they arrived, for return to the client page 264. Server dispatcher engine 126 calculates the server processing time as the difference between when the boxcar of action request is received and when the boxcar of completed responses is ready to be returned, and reports the calculated server processing time back to the middleware application 156.

Structured query language SQL 1 248 to SQL-n 258 can be used to access and manipulate data in external data store 142. In one use case, application servers use Salesforce Object Query Language (SOQL) to access and manipulate data. In other use cases, application servers use SQL to access and manipulate data in MySQL, SQL Server, Access, Oracle, Sybase, DB2, and other database systems.

Because most responses to component action requests are small—in the 2 kB to 5 kB range, based on analyzed experimental data—bandwidth typically has little effect on the speed of transactions for users. Next we describe the measurement of network latency for improving application performance.

The disclosed process of improving the application performance for a user includes dynamically measuring and characterizing the network latency for end users. Measured network latency is calculated as dispatch-to-completed response time minus server processing time, and the server processing time is received from the server for a boxcar of completed responses. In one application context, network latency for each server request is the time spent between the client making a request and the client receiving a response, excluding the time spent on the server.

Figure 3A:
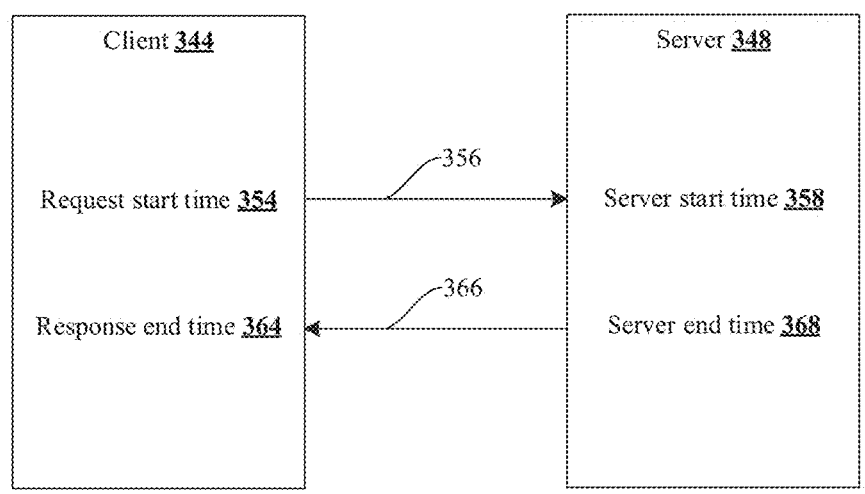
FIG. 3A shows a message diagram for measuring network communication latency between a client and a server.

FIG. 3A shows a message diagram 300 between client and server, with labeled time measurements usable for measuring network latency. In FIG. 3A, client 344 sends XHR request packet 356 at request start time 354. Upon receipt of the packet, server 348 begins processing the contents, at server start time 358. When the server actions are complete, server 348 sends XHR response packet 366 to client 344. The XHR response packet 366 arrives at the client at response end time 364.

Total server time equals server end time minus server start time. Instrumenting the server 348 to capture the server start time 358 and server end time 368 makes it possible to measure the total server time. The data received by instrumenting the client app to record the time at which each XHR request packet 356 is sent and the time when each corresponding XHR response packet 366 is received is usable to calculate the measured server latency.

For an implementation of the disclosed technology, server metrics are appended to the server response and sent to the client 344, and the calculation of total network latency equals the response end time 364 minus the request start time 354 minus the total server time described earlier in this paragraph.

Determining the optimal path for component action requests for a user includes deducing the number of requests from components to boxcar together for the trip to the application server. Middleware application 156 adjusts the inter-boxcar intervals, taking into account the number of connections supported between the user device and the server and the measured network communication latency.

The server dispatcher engine 126 calculates the server processing time as the difference between when the boxcar of action requests is received and when the boxcar of completed responses is ready to be returned, and reports the calculated server processing time back to the middleware application 156.

In another implementation, to determine the optimal path, the total network latency can be calculated on the client and aggregated over a significant sample size of recorded latencies, for each action request, to characterize the user's latency. In addition, this latency information can also be beaconed to the server and logged. For some use cases, this information can be utilized on the server for future optimizations.

In some use cases, users 242 can configure their preferences for dynamic adjustment of boxcarring of action requests from component-driven cloud applications to be based on either absolute page performance or perceived page performance. Perceived page load time is the time required to fetch the components on the client page 264 that make the page partially usable for the user. This will be discussed further later.

Absolute page load time is the time required to fetch all the components on the page from the application server 116 and render them on the client page 264. In this configuration, the goal is to deliver the optimal absolute page performance based on the user's network communication latency.

The disclosed technology includes speeding up performance of a page with multiple components, in a cloud-based environment, by delivering the most optimal absolute page performance. Based on the dynamic network latency of the user, the grading engine 158, in latency engine 146, categorizes the user's transactions and assigns the user to one of several groupings. In one use case, the categories for grouping the users include low latency, average latency, and high latency—listed next, in milliseconds (ms).

Low latency <100 ms
Average latency >100 ms and <300 ms
High latency >300 ms

The number of categories and the groupings for the user's transactions can adapt over time, with the values determined empirically. The system adjusts latency categories according to feedback received as a browser or mobile device changes network connections or the network conditions change. Numbers for delay can also programmatically change or be tuned. That is, hard-coded numbers can change, with more buckets or different values learned with experience. In another use case, the number of latency categories for grouping the users may be different, based on the results of analyzing transaction data for over a period of time described by a number of transmissions, seconds, minutes, hours, days, weeks or months.

When the dynamic network latency falls in the low latency category of less than one hundred ms, action requests can be sent in parallel—utilizing the connections offered by the browser effectively. That is, each action request can be sent as soon as it is received. The number of nearly-concurrent connections used to service components of the web page can be rationed. Middleware application 156 determines the browser or app through which it is coupled in communication with the server and looks up the number of connections supported by the respective browser or app.

Most modern browsers support between six and thirteen concurrent connections per hostname (number of http/1.1 connections that can be opened for the browser), so a default number of nearly-concurrent connections can be initialized to a value of six and the number of available connections can take into consideration the network latency. In one implementation, Browserscope—a community-driven project for profiling web browsers—is usable for discerning the number of concurrent connections per hostname for a client server. Browserscope tracks browser functionality, and gathers latency and other test results from users "in the wild"<May 9, 2016: http://www.browserscope.org/>.

Figure 3B:
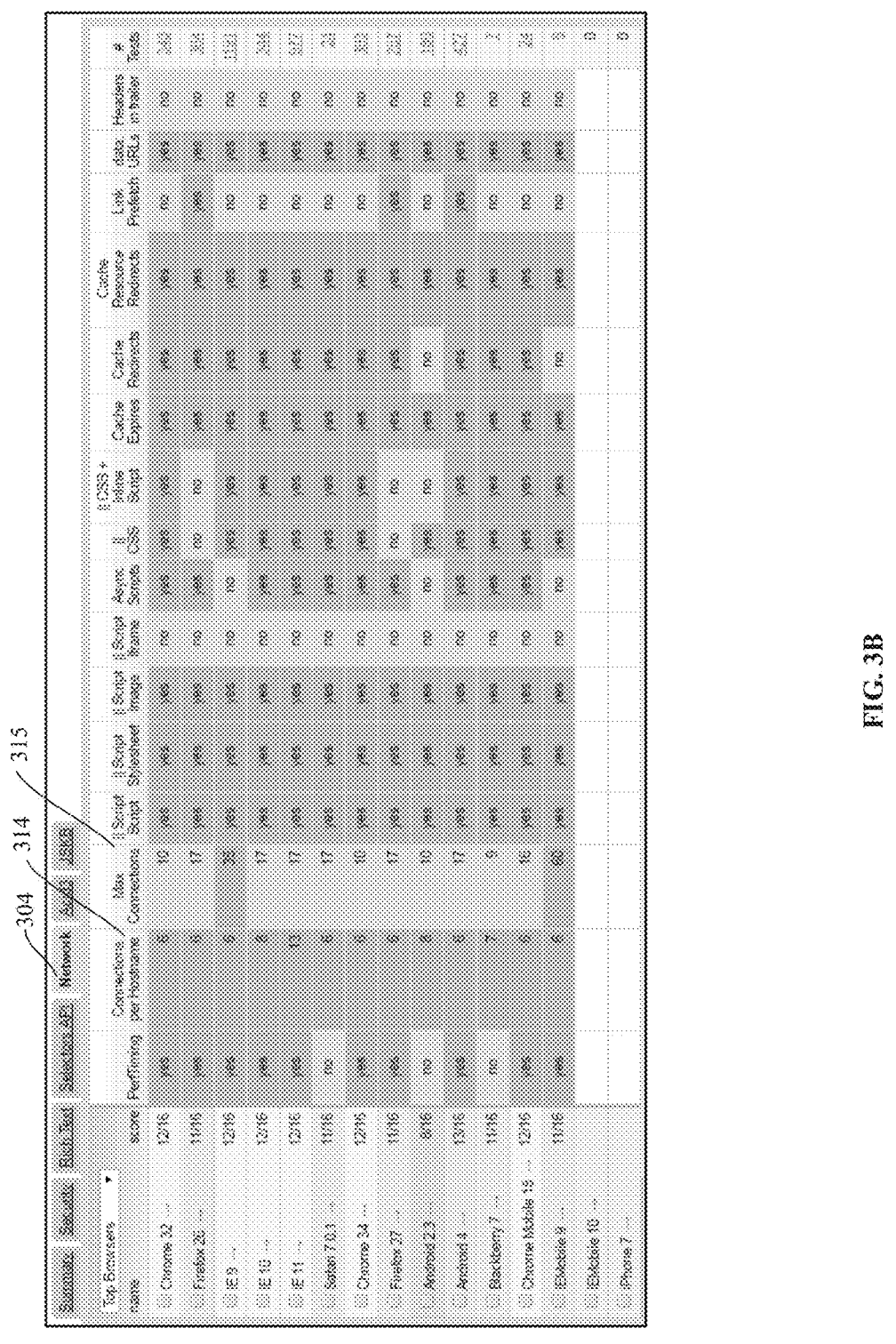

FIG. 3B shows an example dynamic Browserscope browser scorecard for deducing network latency. Users can choose to view results for only desktop browsers, only mobile device browsers, results for a particular family of browsers, or other optional groupings. Network 304 shows tests that address network performance issues, including connections per hostname 314. The column labeled maximum connections 315 refers to the number of connections that the browser will open across all hostnames, which has a typical upper limit of 60.

In the low latency scenario, each component, from component 1 244 to component N 254 of browser/client page 264, makes its own server request directly without enqueuing it into a global action queue. This saves the queuing time and since each action is executed individually on the server, the server time is also optimized. This ensures that the server responses come, in the fastest way, back to the client—thereby delivering the most optimal network performance, based on the user's good latency.

Most users fall in the average latency category—with a measured latency of between 100 ms and 300 ms. For a composite component page, each component requests information from the server by enqueuing its actions into a global action queue. Each component is oblivious to other components on the same page and can make their action requests at any time in their respective component lifecycle.

Client boxcar engine 178 collects all actions that are requested from the composite components around the same time and batches them into a single network request action boxcar XHR-N 255. Client dispatcher engine 186 sends the batched network request to the application server 116. Upon receiving the response boxcar from application server 116, the client 264 decomposes the respective responses to each of the constituent components. Instead of making multiple XHR requests—XHR-1 245 to XHR-N 255 to the server—one for each of the requested component actions, the disclosed technology dynamically adjusts boxcarring of action requests from component-driven cloud applications—reducing the number of network requests to application server 116. In the average case, the batching of action requests to be routed to the server improves network utilization.

The process for handling component requests includes measuring the network latency from initial XHR requests and establishing a network latency category, and dynamically calculating the queue wait time based on the established network latency category. The process includes continuously gathering actions into a collector within the queue wait time window, batching the actions, $A_1, A_2 \ldots A_n$, 245 collected during the calculated queue wait time. The process also includes creating XHR requests 255 with these enqueued action requests $A_1, A_2 \ldots A_n$ 245 and sending the boxcars to the application server 162. The process includes adapting the queue wait time based on measured network latency feedback and action/XHRs in-flight—sent but not yet received, and in-queue. The code snippet listed next shows one implementation of the process. The following function for enqueuing actions gets activated from within an event loop for a component or region.

```
AuraActionService = function AuraActionService ( ) {
  this.NOOP = function( ) { };
  var auraXHR = new Aura.Services.AuraClientService$AuraXHR( );
  var XHRLatency = new
  Aura.Services.AuraClientService$XHRLatency( );
  this.availableXHRs = [ auraXHR ];
  this.allXHRs = [ auraXHR ];
  this.actionStoreMap = { };
  this.collector = undefined;
  this.setQueueSize(this.Browser.MaxConnectionsPerHost);
...
AuraClientService.prototype.enqueueAction = function(action) {
  $A.assert(!$A.util.isUndefinedOrNull(action), "EnqueueAction( )
cannot be called on an undefined or null action.");
  $A.assert($A.util.isAction(action), "Cannot call EnqueueAction( )
with a non Action parameter.");
  this.actionsQueued.push(action);
};
```

The next code snippet shows the function for getting an available XHR.

```
AuraClientService.prototype.getAvailableXHR = function( ) {
  var auraXHR = this.availableXHRs.pop( );
  return auraXHR;
};
```

The next code snippet shows the function for releasing an XHR back into the pool.

```
AuraClientService.prototype.releaseXHR = function(auraXHR) {
  auraXHR.reset( );
  this.availableXHRs.push(auraXHR);
  if (this.inFlightXHRs( ) === 0) {
    this.processXHRIdleQueue( );
  }
};
```

The following code snippet shows the entry point for processing actions: creating a collector, and parceling out the action request handling. After this, action requests will be either getting values from storage or will be executed on the server, and the client action requests will be queued to be executed in the order set via setTimeout, giving server actions entry points to collect.

```
AuraClientService.prototype.process = function( ) {
  if (this.collector) {
    return;
  }
  this.collector = new
  Aura.Services.AuraClientService$AuraActionCollector( );
  this.continueProcessing( );
};
```

The process includes dividing actions into client actions and server actions. Server actions are further divided into stored and non-stored actions, and the following code snippet also protects against server actions collecting early. In the example, actionsQueued refers to the queue of actions that have yet to be processed.

```
AuraClientService.prototype.continueProcessing = function( ) {
  var i;
  var index = 0;
  var action;
  var actionList;
```

```
this.collector.actionsToCollect += 1;
actionList = this.actionsQueued;
this.actionsQueued = [ ];
for (i = 0; i < actionList.length; i++) {
    action = actionList[i];
    try {
        if (action.abortIfComponentInvalid(true)) {
            // action already aborted.
            // this will only occur if the component is no longer valid.
            continue;
        }
        if (action.getDef( ).isServerAction( )) {
            this.collector.actionsToCollect += 1;
            this.collector.collected[index] = undefined;
            this.collector.collecting[index] = action;
            this.collectServerAction(action, index);
            index += 1;
        }
    } catch (e) {
        var errorWrapper = new $A.auraError(null, e);
        errorWrapper.action = action;
        $A.logger.reportError(errorWrapper);
    }
}
this.collector.actionsToCollect -= 1;
};
```

Next in the process, the following code snippet shows collecting a single action into the list, finishing the collection process, and sending the XHR.

```
AuraClientService.prototype.collectServerAction =
    function(action, index) {
        this.collector.collected[index] = action;
        this.collector.actionsToCollect -= 1;
        this.finishCollection( );
    };
...
AuraClientService.prototype.finishCollection = function( ) {
    if (this.collector.actionsToCollect !== 0 ||
        this.collector.clientActions.length) {
        return;
    }
    if (this.collector.actionsCompleted) {
        this.fireDoneWaiting( );
    }
```

If a user has very high network latency greater than 300 ms, more conservative choices are implemented for network requests to improve the user's network performance. The time window for collecting component action requests can be increased to 300 ms to allow for more actions to be boxcarred into the same network request. This helps to mitigate the high latency cost of a user's slow network. In most scenarios, this reduces the number of network requests and thereby delivers a more optimal network performance within the user's bad latency constraints.

The process includes boxcarring into a single XHR composite actions enqueued around the same time, and for measured latency values, waiting for an additional 100 ms and then sending possibly additional actions via a single boxcar XHR, as shown in the following code snippet shows. If the measured latency increases, then the process includes waiting an additional 300 ms, and sending possibly additional actions as a single boxcar XHR.

```
var i = 0;
var length;
var collected = this.collector.collected;
this.collector.collected = [ ];
```

```
for (i = 0, length = collected.length; i < length; i++) {
    if (collected[i]) {
        this.actionsDeferred.push(collected[i]);
    }
}
if (this.actionsQueued.length) {
    this.continueProcessing( );
    return;
}
if (this.actionsDeferred.length) {
    if(XHRLatency.latencyCategory === "average") {
        if(XHRLatency.increasedWait)   {
            XHRLatency.increasedWait = false;
            this.sendActionXHRs(false);
        } else { }
            setTimeout(function( ) {
                XHRLatency.increasedWait = true;
                this.continueProcessing( );
                return;
            }, 100
        );
    }
    } else if(XHRLatency.latencyCategory === "high") {
        if(XHRLatency.increasedWait) {
            XHRLatency.increasedWait = false;
            this.sendActionXHRs(false);
        } else { }
            setTimeout(function( ) {
                XHRLatency.increasedWait = true;
                this.continueProcessing( );
                return;
            }, 300
        );
    }
    } else if(XHRLatency.latencyCategory === "low") {
        this.sendActionXHRs(true);
    }
}
```

The process includes sending requests with the maximum parallelism possible, in cases in which the measured latency is low, and ensuring that all actions get sent, marked as duplicates, or put into a deferred queue. Callback for an XHR for a set of actions includes correctly dealing with the case of interrupted communications, and aborts of requests. The next code snippet shows code for setting the XHR receive time, and a segment of the code used for catching errors, as needed.

```
AuraClientService.prototype.receive = function(auraXHR, timedOut) {
    auraXHR.XHREndTime = Date.now( );
    var responseMessage;
    this.auraStack.push("AuraClientService$receive");
    try {
        responseMessage = this.decode(auraXHR.request, false, timedOut);
        if (responseMessage["status"] === "SUCCESS") {
            this.processResponses(auraXHR, responseMessage["message"]);
            this.processXHRLatency(auraXHR, responseMessage["perf"]);
        } else if (responseMessage["status"] === "INCOMPLETE") {
            this.processIncompletes(auraXHR);
        } else if (responseMessage["status"] === "ERROR") {
            this.processErrors(auraXHR, responseMessage["message"]);
        }
        this.fireDoneWaiting( );
    } catch (e) {
        throw (e instanceof $A.auraError) ? e : new
$A.auraError("AuraClientService.receive action callback failed", e);
    } finally {
        this.auraStack.pop( );
        this.releaseXHR(auraXHR);
        this.process( );
    }
    return responseMessage;
};
```

In this example case, if the latency is greater than 300 ms, the boxcarring is in the "high" category, if the latency is between 100 ms and 300 ms, the latency is in the average category, and if the latency is less than 100 ms, the latency category is "low". The next code snippet shows the receiving of the server start and end timestamps from the server performance instrumentation, and using the values to calculate network latency from the XHR to establish the network latency category.

```
AuraClientService.prototype.processXHRLatency = function(auraXHR) {
    var latency;
    var perf = responseMessage["perf"];
    if (perf) {
        auraXHR.ServerStartTime = perf.serverStartTime;
        auraXHR.ServerEndTime = perf.serverEndTime;
        var_totalServerTime = auraXHR.ServerEndTime -
            auraXHR.ServerStartTime;
        var_totalXHRTime = auraXHR.XHREndTime -
        auraXHR.XHRStartTime;
        latency = _totalXHRTime - _totalServerTime;
            XHRLatency.lastKnownLatency = latency;
            if (latency>=300) {
        XHRLatency.latencyCategory = "high";
        } else if (latency<100) {
        XHRLatency.latencyCategory = "low";
        } else {
        XHRLatency.latencyCategory = "average";
        }
    }
};
```

The process and code snippets described above for dynamic adjustment of boxcarring of action requests from component-driven cloud applications for a user show an implementation for dynamically measuring and characterizing the network latency for end users and for implementing boxcars, based on the measured network latency.

Figure 4:
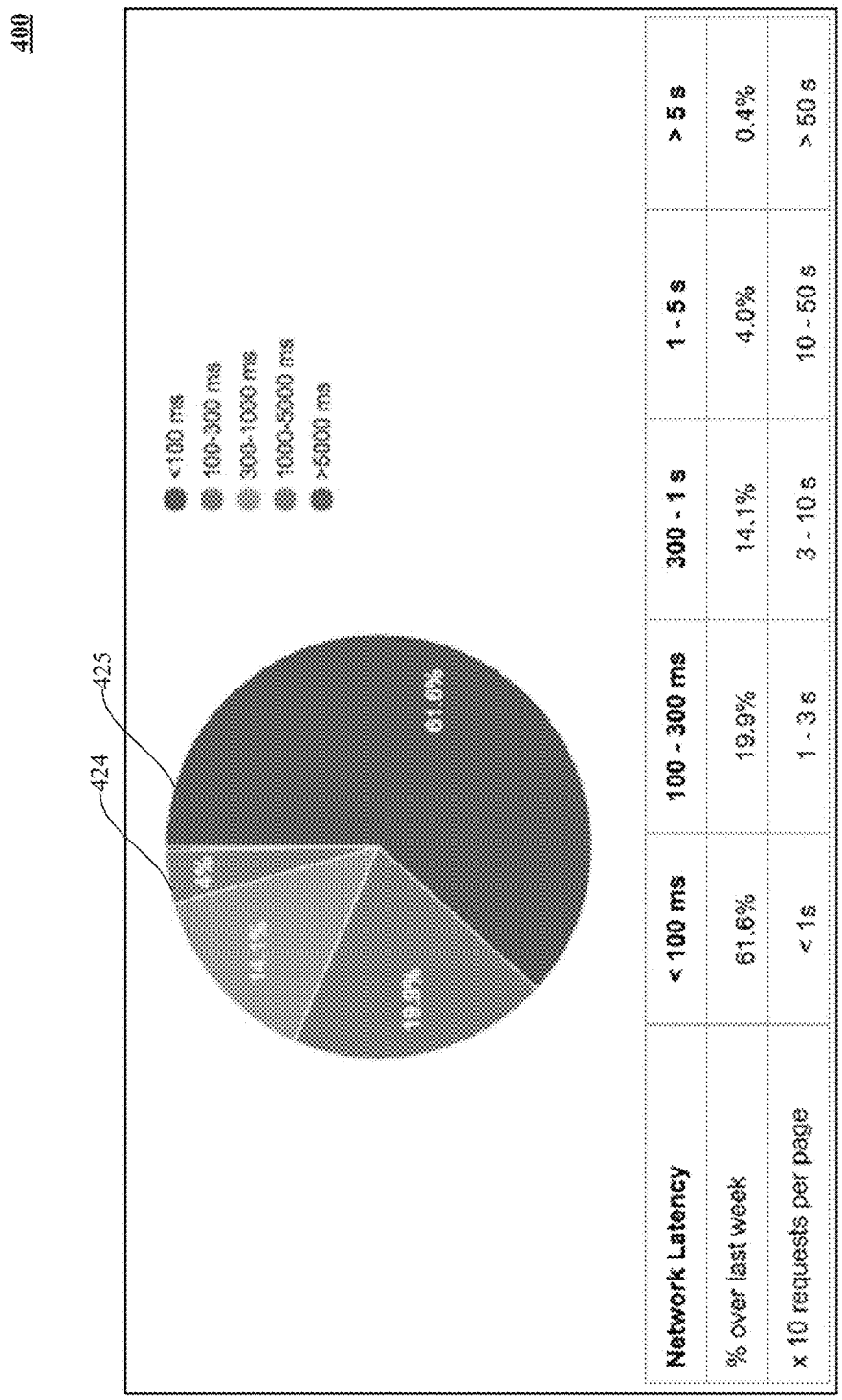
FIG. 4 shows a pie chart that displays network communication latency metric data that spans a week.

FIG. 4 shows a pie chart graph of network latency metrics 400 for a production page. This example set of metric measurement results covers a week of time, for ten requests per page. The graph 400 shows that 61.6% of requests 425 incurred a network latency of less than one hundred ms, so less than one second to transmit ten requests and receive ten component action requests. Only 0.4% of action requests 424 incurred a network latency of greater than five seconds, translating to more than fifty seconds—close to a minute— for ten requests.

Perceived Page Performance

For network utilization improvements based on perceived page performance, users 242 can configure their loading preferences to specify the order for the loading of regions for a page—that is, what components in what regions get loaded in what order. The goal is to deliver the most optimal perceived performance based on the user's network latency. The user perception can be based on configurable options.

Component loading based on a user's viewing choices can include an algorithm that identifies rules for choosing order, or can include an explicit loading order for components that specifies which components to prioritize in the component load order. For example, similar to the way one reads a book, the focus of a user's gaze moves from left to right, and then top to bottom. To give the user the perceived sense of responsiveness when viewing the book, the rules for prioritizing the component load order can specify starting at the top left and then moving across the displayed page, before moving toward the bottom right corner of the page.

Figure 5:
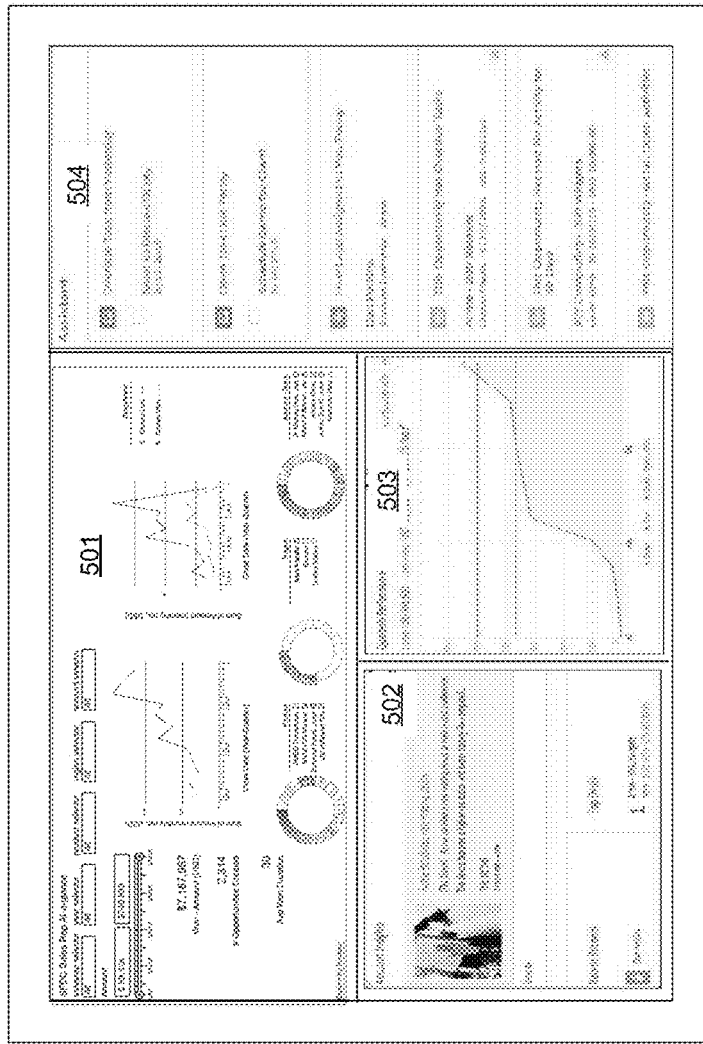
FIG. 5 shows an example use case of component loading prioritization for optimization of perceived page load time.

FIG. 5 shows an example use case of component loading prioritization based on the typical direction of a user's gaze. The example page 500 includes four components: sales rep at a glance 501, account insights 502, quarterly performance 503 and assistant 504, positioned as shown on the page. Rules for prioritizing the component load order can be expressed: Load sales rep at a glance 501, then account insights 502, then quarterly performance 503 and load assistant 504 last. In some use cases, to minimize perceived page load time latency, network latency and boxcarring of action requests can occur separately for the components within the region being loaded.

In another use case, component loading prioritization can be based on user-specified ranking of constituent components of a page—prioritizing one component over another. A client configuration UI can provide a list of all the components on the page to the user, in the page setup, and the user can rank the components in a priority order of their choosing. This is useful in scenarios in which the user has a personal preference for a specific component to load as soon as possible, since that component is the most critical piece of information for them on the page. In one example, a user may want to view assistant 504 first, while the remaining regions of their page are loading.

When a new page is being designed or a page design is being optimized, the designer can use a region-based app editor for adding priority rankings that rank the components in a priority order of the user's choosing, for enhancing perceived page performance for customized pages. Using a region-based app builder interface, a user is allowed to specify which components are assigned to which regions and also allocate a priority for each of these regions. Each component added within the specified region will be loaded based on the assigned priority for that region.

FIG. 6 includes a snippet of code 600 for a region-based app editor, showing example priority labels for regions. In an iFrame, the body includes a series of classes that represent regions of a web page. In the example snippet of code 600, the "top" region 632 is priority one 645 and the bottom left region 652 is priority two 665. Similarly, additional classes can define regions such as bottom right with a priority of three and a region of column side with a priority of four (not shown).

Data consuming applications—browser-based applications 148 or mobile device applications 149 running on a user device 164, 165, make action requests qualified by the priority labels applied to regions and components in the regions and consume data received from at least one application server 116 responsive to the action requests. The priority labels differentiate among display regions rendered by the data consuming application and at least some of the priority labels further differentiate among components within respective display regions.

Middleware application 156, also running on the user device, batches the action requests into batches based at least in part on the priority labels 645, 665, and dispatches boxcars of batched action requests, in which the priority labels differentiate among display regions rendered by the data consuming application and at least some of the priority labels further differentiate among components within respective display regions. The boxcars are segregated by priority label according to a predetermined segregation schedule; and the action requests that are qualified by higher priority labels are dispatched ahead of the action requests with lower priority labels. The server dispatcher engine 126 receives the transmitted boxcar of action requests, forwards the action requests to the application programs, collects responses from the application programs, and returns a responsive boxcar of completed responses. The server dispatcher engine 126 calculates the server processing time as the difference between when the boxcar of action request is received and when the boxcar of completed responses is ready to be returned, and reports the calculated server processing time back to the middleware application 156.

Region load order configuration is very useful for enterprise customers who need to optimize customized pages for enterprise applications in which their clients can add any number of new and third party components of their liking to a page. Predicting the runtime performance of a completely re-architected page can be challenging, and this client configuration UI feature empowers the designer to fine tune the page load time for a page, independently.

System Flow

Figure 7:
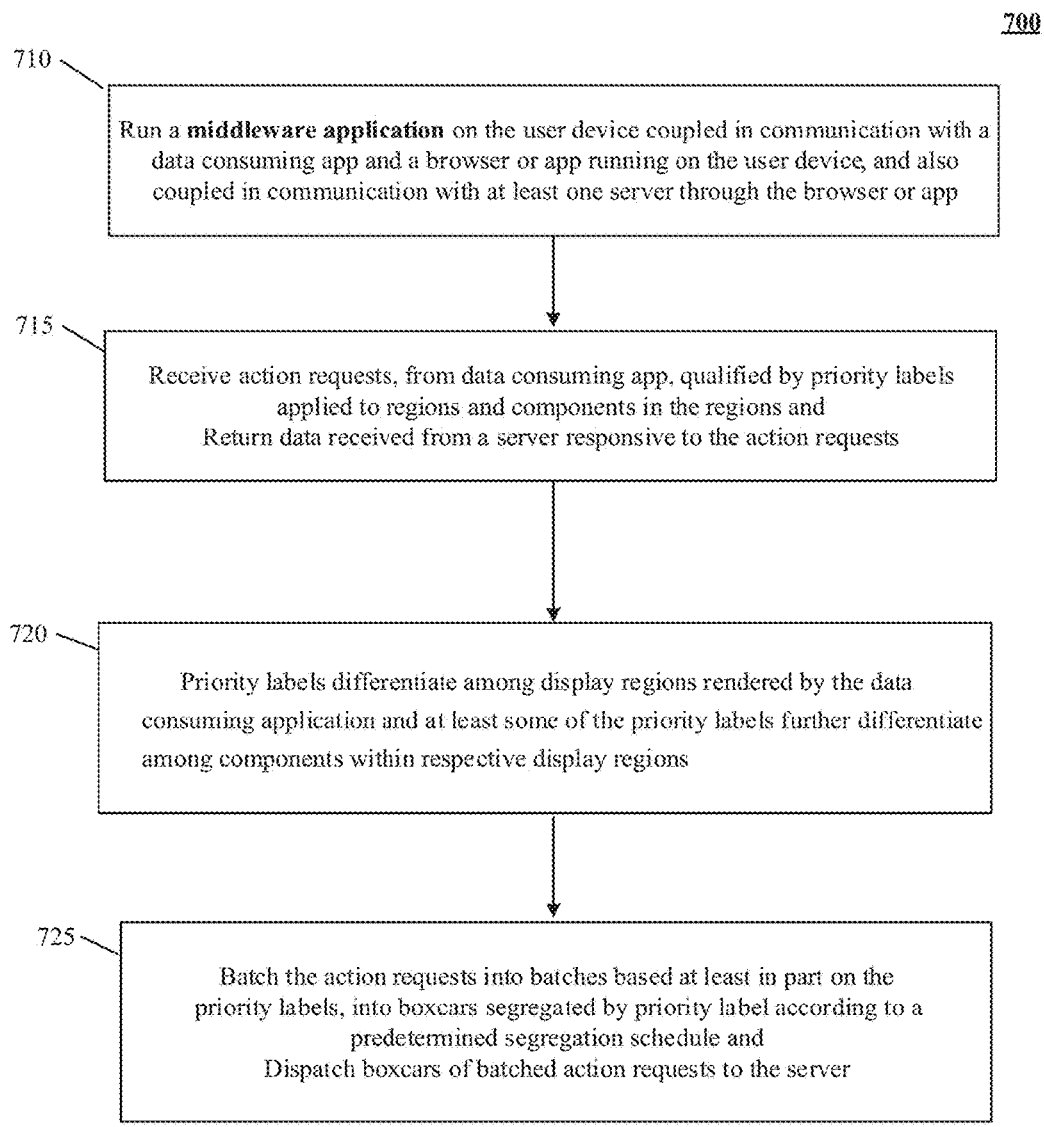
FIG. 7 shows an overview of the flow for adjusting boxcarring of action requests using the priority level of regions and components in component-driven cloud applications.

FIG. 7 illustrates a flowchart of one implementation 700 of implementing a system for priority-driven boxcarring of action requests from component-driven cloud applications. Flowchart 700 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 7. The actions described below can be subdivided into more steps or combined into fewer steps to carry out the method described using a different number or arrangement of steps.

At action 710, run a middleware application on the user device, coupled in communication with a data consuming application and a browser or app running on the user device, and also coupled in communication with at least one server through the browser or app.

At action 715, the middleware application receives action requests from the data consuming application qualified by priority labels applied to regions and components in the regions and returns data received from the server responsive to the action requests.

At action 720, the priority labels differentiate among display regions rendered by the data consuming application and at least some of the priority labels further differentiate among components within respective display regions.

At action 725, the middleware application batches the action requests into batches based at least in part on the priority labels, into boxcars segregated by priority label according to a predetermined segregation schedule, and dispatching the boxcars of batched action requests to the server.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Integration

FIG. 8 presents a block diagram of an exemplary multi-tenant system 800 suitable for implementing dynamic adjustment of boxcarring of action requests from component-driven cloud applications in environment 100 of FIG. 1. In general, the illustrated system 800 of FIG. 8 includes a server 804 that dynamically creates and supports virtual applications 816 and 818, based upon data 822 from a common database 832 that is shared between multiple tenants, alternatively referred to herein as a "multi-tenant database". Data and services generated by the virtual applications 816 and 818, including GUI clients, are provided via a network 845 to any number of client devices 848 or 858, as desired.

As used herein, a "tenant" or an "organization" refers to a group of one or more users that shares access to common subset of the data within the multi-tenant database 832. In this regard, each tenant includes one or more users associated with, assigned to, or otherwise belonging to that respective tenant. Stated another way, each respective user within the multi-tenant system 800 is associated with, assigned to, or otherwise belongs to a particular tenant of the plurality of tenants supported by the multi-tenant system 800. Tenants may represent users, user departments, work or legal organizations, and/or any other entities that maintain data for particular sets of users within the multi-tenant system 800. Although multiple tenants may share access to the server 804 and the database 832, the particular data and services provided from the server 804 to each tenant can be securely isolated from those provided to other tenants. The multi-tenant architecture therefore allows different sets of users to share functionality and hardware resources without necessarily sharing any of the data 822 belonging to or otherwise associated with other tenants.

The multi-tenant database 832 is any sort of repository or other data storage system capable of storing and managing the data 822 associated with any number of tenants. The database 832 may be implemented using any type of conventional database server hardware. In various implementations, the database 832 shares processing hardware with the server 804. In other implementations, the database 832 is implemented using separate physical and/or virtual database server hardware that communicates with the server 804 to perform the various functions described herein. The multi-tenant database 832 may alternatively be referred to herein as an on-demand database, in that the multi-tenant database 832 provides (or is available to provide) data at run-time to on-demand virtual applications 816 or 818 generated by the application platform 817, with tenant1 metadata 812 and tenant2 metadata 814 securely isolated.

In practice, the data 822 may be organized and formatted in any manner to support the application platform 817. In various implementations, conventional data relationships are established using any number of pivot tables 813 that establish indexing, uniqueness, relationships between entities, and/or other aspects of conventional database organization as desired.

The server 804 is implemented using one or more actual and/or virtual computing systems that collectively provide the dynamic application platform 817 for generating the virtual applications. For example, the server 804 may be implemented using a cluster of actual and/or virtual servers operating in conjunction with each other, typically in association with conventional network communications, cluster management, load balancing and other features as appropriate. The server 804 operates with any sort of conventional processing hardware such as a processor 836, memory 838, input/output features 834 and the like. The input/output 834 generally represent the interface(s) to networks (e.g., to the network 845, or any other local area, wide area or other network), mass storage, display devices, data entry devices and/or the like. User interface input devices 834 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 817.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 836 to the user or to another machine or computer system.

The processor 836 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 838 represents any non-transitory short or long term storage or other computer-readable media capable of storing programming instructions for execution on the processor 836, including any sort of random access memory (RAM), read only memory (ROM), flash memory, magnetic or optical mass storage, and/or the like. The computer-executable programming instructions, when read and executed by the server 804 and/or processor 836, cause the server 804 and/or processor 836 to create, generate, or otherwise facilitate the application platform 817 and/or virtual applications 816 and 818, and perform one or more additional tasks, operations, functions, and/or processes described herein. It should be noted that the memory 838 represents one suitable implementation of such computer-readable media, and alternatively or additionally, the server 804 could receive and cooperate with external computer-readable media that is realized as a portable or mobile component or application platform, e.g., a portable hard drive, a USB flash drive, an optical disc, or the like.

The application platform 817 is any sort of software application or other data processing engine that generates the virtual applications 816 and 818 that provide data and/or services to the client devices 848 and 858. In a typical implementation, the application platform 817 gains access to processing resources, communications interfaces and other features of the processing hardware using any sort of conventional or proprietary operating system 828. The virtual applications 816 and 818 are typically generated at run-time in response to input received from the client devices 848 and 858.

With continued reference to FIG. 8, the data and services provided by the server 804 can be retrieved using any sort of personal computer, mobile telephone, tablet or other network-enabled client device 848 or 858 on the network 845. In an exemplary implementation, the client device 848 or 858 includes a display device, such as a monitor, screen, or another conventional electronic display capable of graphically presenting data and/or information retrieved from the multi-tenant database 832.

In some implementations, network(s) 845 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

In one implementation, a disclosed system includes a user device and a server, coupled in communication, including a data consuming application, running on a user device, that makes action requests qualified by priority labels applied to regions and components in the regions and that consumes data received from at least one server responsive to the action requests. A middleware application, also running on the user device, batches the action requests into batches based at least in part on the priority labels, and dispatches boxcars of batched action requests. The priority labels differentiate among display regions rendered by the data consuming application and at least some of the priority labels further differentiate among components within respective display regions. The boxcars are segregated by priority label according to a predetermined segregation schedule; and the action requests that are qualified by higher priority labels are dispatched ahead of the action requests with lower priority labels. The disclosed system also includes a browser or app running on the user device, in communication with the middleware application, that supports the data consuming application; and the server, running a dispatcher and one or more application programs; and the dispatcher receives the boxcar of action requests, forwards the action requests to the application programs, collects responses from the application programs, and returns a responsive boxcar of completed responses.

For some implementations of the disclosed system, the priority labels are set using an attribute of a DIV html tag. The disclosed system further includes the middleware application, further implementing measurement of network communication latency, setting of inter-boxcar intervals used to dispatch the batches of action requests, wherein the measured network communication latency is calculated as dispatch-to-completed response time minus server processing time and the server processing time is received from the server for a boxcar of completed responses. The inter-boxcar intervals are adjusted taking into account at least (a) a number of connections supported between the user device and the server and (b) the measured network communication latency.

In one implementation of the disclosed system, the middleware application repeatedly measures network communication latency and readjusts the inter-boxcar intervals used to dispatch batches of action requests based on updated measurements, and adjusts the inter-boxcar intervals used to time when to dispatch batches of action requests to 250-350 ms when the measured network communication latency exceeds 300 ms. The middleware application also can identify the browser or app through which it is coupled in communication with the server and looks up the number of connections supported by the identified browser or app. For the disclosed system, the middleware application receives the boxcar of completed responses grouped to respond to a respective boxcar of action requests.

For one implementation, a user device runs a middleware application, coupled in communication with a data consuming application and a browser or app running on the user device, and also coupled in communication with at least one server through the browser or app; wherein the middleware application receives action requests from the data consuming application qualified by priority labels applied to regions and components in the regions and returns data received from the server responsive to the action requests. The priority labels differentiate among display regions rendered by the data consuming application and at least some of the priority labels further differentiate among components within respective display regions. The action requests that are qualified by higher priority labels are dispatched ahead of the action requests with lower priority labels. The middleware application batches the action requests into batches based at least in part on the priority labels, into boxcars segregated by priority label according to a predetermined segregation schedule, and dispatches the boxcars of batched action requests. The middleware application further measures network communication latency and adjusts inter-boxcar intervals used to dispatch the batches of action requests, and calculates the measured network communication latency as dispatch-to-completed response time minus server processing time, using the server processing time received from the server for a boxcar of completed responses. The inter-boxcar intervals are adjusted, taking into account at least (a) a number of connections supported between the user device and the server and (b) the measured network communication latency.

For some implementations of the user device, the middleware application repeatedly measures network communication latency and readjusts the inter-boxcar intervals used to dispatch batches of action requests based on updated measurements. The middleware application adjusts the inter-boxcar intervals used to time when to dispatch batches of action requests to 250-350 ms when the measured network communication latency exceeds 300 ms, and the middleware application identifies the browser or app through which it is coupled in communication with the server and looks up the number of connections supported by the identified browser or app. The middleware application receives the boxcar of completed responses grouped to respond to a respective boxcar of action requests.

In another implementation, a disclosed server runs a dispatching application, coupled in communication with a multiplicity (100 or more) of middleware applications running on respective user devices and one or more application programs running on the server. The dispatcher receives boxcarred batches of action requests from the middleware applications in priority-based batches, forwards the action requests to the application programs, and returns responsive boxcars of completed responses; and calculates a server processing time as a difference between when a particular boxcar of action requests is received and when a respective boxcar of completed responses is ready to be returned and further reports the calculated server processing time back to the middleware application for the respective boxcar of completed responses. The dispatcher further identifies respective application programs that will respond to the action requests received in a particular boxcar from one of the middleware applications and dispatches the action requests from the particular boxcar to the responsive application programs. In some implementations of the disclosed server, the dispatcher postpones returning responses to action requests from a particular boxcar until it has received (or timed out on) responses to all of the action requests in the particular boxcar.

In yet another implementation, a disclosed method conserves connections between a browser or app running on a user device and at least one server, including running a middleware application on the user device, coupled in communication with a data consuming application and a browser or app running on the user device, and also coupled in communication with at least one server through the browser or app. The middleware application receives action requests from the data consuming application qualified by priority labels applied to regions and components in the regions and returns data received from the server responsive to the action requests. The priority labels differentiate among display regions rendered by the data consuming application and at least some of the priority labels further differentiate among components within respective display regions; and the middleware application batches the action requests into batches based at least in part on the priority labels, into boxcars segregated by priority label according to a predetermined segregation schedule, and dispatches the boxcars of batched action requests to the server. The middleware application measures network communication latency and adjusting inter-boxcar intervals used to dispatch batches of action requests, and calculates the measured network communication latency as dispatch-to-completed response time minus server processing time, using the server processing time received from the server for a boxcar of completed responses. The middleware application also adjusts the inter-boxcar intervals taking into account at least (a) a number of connections supported between the user device and the server and (b) the measured network communication latency. The disclosed method further includes repeatedly measuring network communication latency and readjusting the inter-boxcar intervals used to dispatch batches of action requests based on updated measurements.

For some implementations, the disclosed method further includes adjusting the inter-boxcar intervals used to time when to dispatch batches of action requests to 250-350 ms when the measured network communication latency exceeds 300 ms. The middleware application identifies the browser or app through which it is coupled in communication with the server and looking up the number of connections supported by the identified browser or app. The middleware application receives the boxcar of completed responses grouped to respond to a respective boxcar of action requests.

In one implementation a disclosed method conserves connections between a browser or app running on a user device and at least one server, including a dispatcher running on the server and coupled in communication with a multiplicity of middleware applications running on respective user devices and one or more application programs running on the server. The dispatcher receives boxcarred batches of action requests in priority-based batches from the middleware applications, forwards the action requests to the application programs, and returning responsive boxcars of completed responses; and calculates a server processing time as a difference between when a particular boxcar of action requests is received and when a respective boxcar of completed responses is ready to be returned and further reporting the calculated server processing time back to the middleware application for the respective boxcar of completed responses. The dispatcher identifies respective application programs that will respond to the action requests received in a particular boxcar from one of the middleware applications and dispatching the action requests from the particular boxcar to the responsive application programs. In some implementations, the dispatcher postpones returning responses to action requests from a particular boxcar until it has received (or timed out on) responses to all of the action requests in the particular boxcar.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system including a user device and a server device, coupled in communication, including:
   the user device configured to:
   determine an action request by a data consuming application that consumes data received from the server responsive to the action request, the action request associated with a priority label applied to a display region rendered by the data consuming application;
   place, by a middleware application, the action request into a first batch based on the priority label and a predetermined segregation schedule;
   manage, by the middleware application, a pool of request objects; and
   send, to the server device via a request object from the pool of request objects, the first request batch as a first boxcar ahead of a second request batch based on the priority label; and
   the server device configured to:
   receive the first boxcar and forward the action request to an application program of the server;
   collect a response to the action request from the application program;
   send the response in a second boxcar corresponding to the first boxcar, the second boxcar including other responses associated with the first boxcar.

2. The system of claim 1, wherein the priority label is set using an attribute of a DIV html tag.

3. The system of claim 1, wherein the user device is further configured to:
   receive a server processing time from the server device, the server processing time corresponding to a third boxcar of responses;
   determine, by the middleware application, network communication latency based on a server response time and the server processing time;
   determine an inter-boxcar interval based on (a) a number of connections supported between the user device and the server device and (b) the network communication latency; and
   send a fourth boxcar and a fifth boxcar to the server device based on the inter-boxcar interval, the inter-boxcar interval identifying a duration of time between sending the fourth boxcar and the fifth boxcar.

4. The system of claim 3, wherein the network communication latency is a first network communication latency, the inter-boxcar interval is an original inter-boxcar interval, and the user device is further configured to:
   determine, by the middleware application, a second network communication latency;
   determine, by the middleware application, an updated inter-boxcar interval based on the second network communication latency; and
   send a sixth boxcar and a seventh boxcar to the server device based on the updated inter-boxcar interval, the updated inter-boxcar interval identifying a duration of time between sending the sixth boxcar and the seventh boxcar.

5. The system of claim 3, wherein to determine the inter-boxcar interval, the server device is further configured to:
   set, by the middleware application, the inter-boxcar interval to 250-350 ms when the network communication latency exceeds 300 ms.

6. The system of claim 3, wherein the user device is further configured to:
   identify, by the middleware application, a browser or app through which the middleware application is coupled in communication with the server device; and
   determine the number of connections supported between the user device and the server device based on the browser or app.

7. The system of claim 3, wherein the user device is further configured to:
   receive the second boxcar via the middleware application.

8. A user device comprising:
   a memory including a middleware application coupled in communication with a data consuming application; and
   at least one processor coupled to the memory and configured to:
   receive, by the middleware application, an action request from the data consuming application, the action request associated with a priority label applied to a display region rendered by the data consuming application;
   place, by the middleware application, the action request into a first batch request based on the priority label and a predetermined segregation schedule;
   manage, by the middleware application, a pool of request objects; and send, to a server device via a request object of the pool of request objects, the first request batch as a boxcar ahead of a second request batch based on the priority label.

9. The user device of claim 8, wherein the boxcar is a first boxcar and the at least one processor is further configured to:
receive a server processing time from the server device, the server processing time corresponding to a second boxcar of responses;
determine, by the middleware application, network communication latency based on a server response time and the server processing time;
determine an inter-boxcar interval based on (a) a number of connections supported between the user device and the server device and (b) the network communication latency; and
send a third boxcar and a fourth boxcar to the server device based on the inter-boxcar interval, the inter-boxcar interval identifying a duration of time between sending the third boxcar and the fourth boxcar.

10. The user device of claim 9, wherein the network communication latency is a first network communication latency, the inter-boxcar interval is an original inter-boxcar interval, and the at least one processor is further configured to:
determine, by the middleware application, a second network communication latency;
determine, by the middleware application, an updated inter-boxcar interval based on the second network communication latency; and
send a fifth boxcar and a sixth boxcar to the server device based on the updated inter-boxcar interval, the updated inter-boxcar interval identifying a duration of time between sending the fifth boxcar and the sixth boxcar.

11. The user device of claim 9, wherein the at least one processor is further configured to:
set, by the middleware application, the inter-boxcar interval to 250-350 ms when the network communication latency exceeds 300 ms.

12. The user device of claim 9, wherein the at least one processor is further configured to:
identify, by the middleware application, a browser or app through which the middleware application is coupled in communication with the server device; and
determine the number of connections supported between the user device and the server device based on the browser or app.

13. The user device of claim 9, wherein the at least one processor is further configured to:
receive the second boxcar via the middleware application.

14. A server device, comprising:
a memory including a dispatcher and a plurality of application programs, the dispatcher coupled in communication with a middleware application running on a user device;
at least one processor coupled to the memory and configured to:
receive, by the dispatcher, a first request boxcar including a priority-based batch of action requests from the middleware application;
forward, by the dispatcher, the action requests to the plurality of application programs;
send, by the dispatcher, a first response boxcar including responses to the action requests;
determine, by the dispatcher, a server processing time based on a difference between when a second request boxcar of action requests is received and when a corresponding second response boxcar of responses is ready to be returned; and
send the determined server processing time to the middleware application.

15. The server device of claim 14, wherein to forward the action requests to the plurality of application programs, the at least one processor is further configured to:
determine, by the dispatcher, an application program of the plurality of application programs that is associated with an action request of the first request boxcar; and
forward the action request to the application program.

16. The server device of claim 14, wherein the at least one processor is further configured to:
postpone, by the dispatcher, the sending of the response boxcar until the dispatcher has received a time out or application program response to all of the action requests in the first request boxcar.

17. A method that conserves connections between a browser or app running on a user device and at least one server device, comprising:
receiving, by a middleware application running on the user device, an action request from a data consuming application, wherein the action request is qualified by a priority label associated with a display region rendered by the data consuming application;
placing, by the middleware application, the action request into a first request batch based on the priority label and a predetermined segregation schedule;
managing, by the middleware application, a pool of request objects; and
sending, to the at least one server device via a request object of the pool of request objects, the first request batch as a request boxcar ahead of a second request batch based on the priority label.

18. The method of claim 17, wherein the request boxcar is a first request boxcar, and further comprising:
receiving a server processing time from the at least one server device, the server processing time corresponding to a response boxcar;
determining, by the middleware application, network communication latency based on a server response time and the server processing time;
determining an inter-boxcar interval based on (a) a number of connections supported between the user device and the at least one server device and (b) the network communication latency; and
sending a second request boxcar and a third request boxcar to the at least one server device based on the inter-boxcar interval, the inter-boxcar interval identifying a duration of time between sending the second request boxcar and the third request boxcar.

19. The method of claim 18, wherein the network communication latency is a first network communication latency, the inter-boxcar interval is an original inter-boxcar interval, and further comprising:
determining an updated inter-boxcar interval based on the second network communication latency; and
sending a fourth request boxcar and a fifth request boxcar to the at least one server device based on the updated inter-boxcar interval, the updated inter-boxcar interval identifying a duration of time between sending the fourth request boxcar and the fifth request boxcar.

20. The method of claim 18, further comprising:
setting the inter-boxcar interval to 250-350 ms when the network communication latency exceeds 300 ms.

21. The method of claim 18, further comprising:
identifying, by the middleware application, a browser or app through which the middleware application is coupled in communication with the at least one server device; and
determining the number of connections supported between the user device and the at least one server device based on the browser or app.

22. The method of claim 17, further comprising:
receiving the response boxcar via the middleware application.

23. A method that conserves connections between a browser or app running on a user device and at least one server device, the method comprising:
receiving, by a dispatcher of the at least one server device, a first request boxcar including a priority-based batch of action requests from a middleware application of the user device;
forwarding, by the dispatcher, the action requests to a plurality of application programs executing on the at least one server device;
receiving, by the dispatcher, a plurality of responses corresponding to the action requests from the plurality of application programs;
sending a first response boxcar including the plurality of responses;
determining, by the dispatcher, a server processing time based on a difference between when a second request boxcar of action requests is received and when a second response boxcar of responses is ready to be returned; and
sending, by the dispatcher, the determined server processing time to the middleware application.

24. The method of claim 23, wherein forwarding the action requests further comprises:
determining, by the dispatcher, an application program of the plurality of application programs associated with an action request of the first request boxcar; and
forwarding the action request to the application program.

25. The method of claim 23, further comprising:
postponing, by the dispatcher, the sending of the first response boxcar until the dispatcher has received a time out or response to all of the action requests in the first request boxcar.

* * * * *